Patented Nov. 30, 1937

2,100,593

UNITED STATES PATENT OFFICE 2,100,593

PROCESS OF PREPARING A SUBSTANCE IN-
CREASING THE BLOOD PRESSURE

Georg Hessel and Hans Maier, Frankfort-on-the-
Main, Germany

No Drawing. Application August 10, 1935, Serial
No. 35,673. In Germany August 14, 1934

6 Claims. (Cl. 167—74)

The present invention relates to the preparation of a pharmacologically active substance which has particular properties increasing the blood pressure.

It is known that an aqueous extract from kidneys causes an action reducing the blood pressure and an action raising the blood pressure. Furthermore it is known that extracts obtained from kidneys by means of organic solvents show no action increasing the blood pressure. By extracting kidneys by boiling them with the aid of aqueous solvents there can likewise not be obtained an extract which causes an action increasing the blood pressure.

Now we have found that the body increasing the blood pressure contained in the kidney may be produced in a pure form from the kidney, furthermore from the spleen and from the blood from warm-blooded animals according to a process which in its principal parts works in the following manner:

From the starting substance, for instance, from the kidney an extract is produced from which the component reducing the blood pressure is removed in a suitable manner. From this extract the component raising the blood pressure is precipitated by treating the extract with an acidified salt solution. From this precipitate the substance increasing the blood pressure is dissolved out in a suitable manner; the pigments and the albuminous substances still contained in the solution are then eliminated and from the filtrate the component increasing the blood pressure is extracted with the aid of adsorbing agents from which it is dissolved by treating it with aqueous solutions having a readily alkaline reaction.

As to the process it is specified in the following:

The substance increasing the blood pressure is preferably obtained from fresh kidneys of warm-blooded animals; for the preparation of a pressed cake fresh kidneys, if desired in a frozen state, or also dried kidneys are comminuted and mixed with the usual additions, such as a large quantity of sand and a small amount of kieselguhr; care must be taken that the pressed cake so prepared has a sufficient moisture content. In order to prevent a decomposition of the starting material, substances, such as for instance, xylene, thymol, ether, cresol, toluene, tricresol, sodium fluoride and others are added. The crude juice obtained from the pressed cake after expressing it is freed by dialysis with distilled water from the main portion of the substance reducing the blood pressure besides other substances. Since in the expressed cake still further quantities of the substance increasing the blood pressure are present, it is advantageous to extract the pressed cake several times with water to which preferably a small amount of a salt with a neutral or weakly alkaline reaction is added and to dialyze the extract obtained. These extracts are combined with the pressed juice already dialyzed.

Instead of preparing a pressed cake from ground kidneys the starting solution for the manufacture may also be prepared by treating the fresh magma of the kidneys by means of suitable organic solvents, such as for instance, acetone, alcohols, ethers or mixtures of these substances. The main portion of the substance reducing the blood pressure is thereby taken away from the magma of the kidney; after removing the solvent, the magma of the kidney is then extracted with appropriate agents, for instance, with a salt solution having a weakly alkaline or neutral reaction and of a small concentration, preferably in a sodium chloride concentration of 0.9 to 5%, or with weak organic acids, weak bases, buffer solutions or aqueous organic solvents, such as aqueous glycerine or aqueous alcohol. On extraction with aqueous organic solvents, the solvent is eliminated by concentration in the vacuum and the residue is taken up with water. In case glycerine is used dialysis with water is sufficient. The aqueous solution thus obtained serves as starting material for the further operation.

The total amount of the starting solution obtained according to one of the methods above described is brought to a weakly acid reaction in a hydrogen ion concentration of 3-5, and mixed, in order to precipitate the substance increasing the blood pressure, with salt until saturation occurs. On application of sodium chloride the most favorable hydrogen ion range, measured with the Wulff foil colorimeter, is between 4.4 and 4.6. The solution thus treated is kept at a temperature of 37° C. for a long time, for instance 16 to 24 hours, in an incubator.

Besides sodium chloride there may also be used other salts usual for the precipitation of albuminous bodies, for instance, magnesium chloride, sodium sulfate, potassium chloride, magnesium sulfate or ammonium sulfate; when the two last named salts are employed heating is not necessary. Also in these cases care must be taken that the pH interval of 3-5 is observed.

The precipitate obtained in this manner which still contains ballast substances, besides the substances increasing the blood pressure, is dialyzed in order to liberate to a large extent the substance increasing the blood pressure from the electrolyte. It must, however, be considered that the contents of salt, for instance, of sodium chloride in the internal dialysate does not fall below 3-4%, since otherwise danger occurs that there also precipitates the body raising the blood pressure. The internal dialysate is then freed from the suspended ballast substances by filtration or centrifugation; the filtrate contains the substance increasing the blood pressure. This operation may be repeated several times in order to enrich and further purify the substance raising the blood pressure. The filtrate obtained which is still rich in pigment is brought to a pH range between 3 and 4 whereby a small salt concentration is maintained; this can be carried out by the addition of inorganic or water-soluble organic acids, such as, for instance, hydrochloric acid, sulfuric acid, oxalic acid, tartaric acid, lactic acid or acetic acid. By this acidification the pigments are precipitated whereas the body increasing the blood pressure remains in the dissolved state.

The substance raising the blood pressure is adsorbed from the solution freed from the pigment by a sufficient quantity of an adsorbing agent, such as kaolin, silica gel, aluminum oxide, colloidal iron oxide, activated carbon and others. The substance increasing the blood pressure is dissolved again by treating the adsorbing agent with a weakly alkaline salt solution or by weakly alkaline organic solvents containing water; during this operation a pH range of about 7-8 in both directions must not be exceeded.

By elimination of the electrolyte and subsequent concentration of the aqueous solutions thus obtained a therapeutically highly active product is obtained.

The body obtained according to the process above described is readily soluble in water and in salt solutions of not too high a concentration; furthermore it is soluble in diluted organic acids, such as acetic acid, lactic acid, carbonic acid and in strongly diluted mineral acids, such as sulfuric acid. It is furthermore soluble in hydrogen sulfide-water, weak alkalies, such as sodium bicarbonate and secondary sodium phosphate. From aqueous solutions it is precipitated by the action of heavy metal salts and alkaloid precipitants. The body is insoluble in the usual organic solvents, such as alcohol, ether, acetone, petroleum ether, chloroform, ethylacetate, dioxane, etc. The body cannot be dialyzed and is inactivated by tryptic digestion, by heating it over 56° C. and by the action of strong acids and alkalies.

As to the pharmacological point of view, the substance has the following properties: the blood pressure undergoes a prompt, slow, long lasting increase when an effective amount is injected. We designate the amount of active substance by which this action is attained as a biological unity. As to its weight a unit amounts, calculated per kilogram of animal, to 0.05 mg. of dry substance. (As an active quantity, calculated upon the blood pressure of the dog in the biological test, we designate an increase of 30 mm. of mercury beyond the formerly existing blood pressure of the animal used for vivisection). The blood pressure thus increased is but slowly reduced; the formerly existing blood pressure is reached within 30 to 60 minutes. The pharmacological test yields the following results:

| Isolated vessels | Contraction, long lasting |
|---|---|
| Heart | Raising |
| Intestine | Small raising |
| Uterus | Not-influenced |
| Iris | Not-influenced |
| Metabolism of the carbohydrate | Not-influenced |
| Water conservancy | Not-influenced |
| Melanophores | Not-influenced |

Consequently the substance is a decided pharmacological body having a tonic effect on the vessels.

The following example serves to illustrate the invention, but it is not intended to limit it thereto:

15 fresh kidneys of pig are decapsulated, the renal pelvis and the adhering fat are removed and the kidneys thus prepared are strongly washed out with water containing toluene until they are practically free from blood. On addition of a large amount of toluene these kidneys are passed through a meat mincing machine. After the toluene has been decanted 2 kilos of sand are added to the mass, the magma triturated in the mortar and then by a further addition of kieselguhr (about ⅓ of the weight of the renal cortex) brought into a condition capable of being pressed. After the material has been pressed off under a pressure of about 400 atmospheres the pressed juice obtained is immediately subjected to the dialysis with running distilled water until practically no substance reducing the blood pressure can be detected any longer by animal test in the internal dialysate.

In order to obtain the amount of the substance increasing the blood pressure still contained in the pressed cake, the pressed cake is extracted several times with a sodium chloride solution of a small percentage, for instance, of about 5 per cent. The extract is dialyzed and added to the already dialyzed pressed juice.

The ballast substances precipitated during the dialysis are removed by filtration. For isolating the active substance the filtrate is mixed with sodium chloride at a pH of about 4-5, preferably at a pH of 4.4-4.6 until saturation occurs. This hydrogen ion concentration is attained by an addition of acetic acid of preferably 2% strength. By the saturation with sodium chloride a complete precipitation is attained in about 16 hours by keeping the batch in the incubator, if desired, with addition of toluene, at a temperature of 37° C. The precipitate is filtered and largely freed from adhering liquid. The residue which is still moist is suspended in water and rapidly dialyzed for about 4-5 hours until in the internal dialysate the content of sodium chloride has gone down to 2-5%. The precipitated ballast substances are eliminated by filtration. The filtrate may again be saturated with sodium chloride at the above indicated hydrogen ion concentration and the residue obtained may be subjected to dialysis in a manner like that indicated above.

While the small content of sodium chloride in this solution is maintained, the ballast substances, chiefly pigments, which are still present are removed by precipitation at a pH of 3-3.5, preferably at a pH of 3.3-3.4. For the removal of these pigments it is suitable to use a weak, organic acid, for instance, an aqueous lactic acid solution of a moderate concentration. For 1000 cc. of the filtrate obtained as above described 60 cc. of a normal lactic acid are generally sufficient in order to attain the indicated hydrogen ion concentration and in consequence the precipitation of the pigments. The ballast substances are eliminated by filtration from the liquid containing the active substance.

The adsorption of the substances increasing the blood pressure is then carried out by addition of about 1-3% of kaolin. After shaking in the shaking apparatus the liquid is eliminated by filtering it with suction, the residue is washed out until the reaction is neutral; the active substance is then detached from the adsorbent with an aqueous solution of 1 per cent strength of secondary sodium phosphate. 25-30 cc. of this solution are generally sufficient for 10 grams of the kaolin used in order to completely dissolve the substance increasing the blood pressure. The weakly yellow highly active filtrate is again filtered and subjected to ultra-filtration, preferably with a weakly alkaline reaction (pH about 7-8). The ultra-filtration is carried out with suitable albumen-tight membranes. It is continued and the residue is washed out with twice distilled water free from carbonic acid until a drop of the filtrate does no longer leave any residue. In this condition the residue is concentrated in the vacuum over sulfuric acid and caustic potash. The product thus obtained is in its pulverized form a weakly yellow, highly active preparation of the properties indicated.

It is advisable to carry out all steps as far as possible with exclusion of air; this is attained by covering the liquids with toluene or another suitable agent.

In order to obtain a preparation suitable for determination of the chemical constitution this therapeutically applicable preparation may be dissolved in water and again precipitated by addition of acetic acid of a small concentration. Most of the active substance is contained in the precipitate, whereas the filtrate contains contaminations. The same result is attained by the addition of heavy metal salts, for instance, an aqueous solution of lead acetate, to the aqueous solution of the therapeutically applicable product. In this case the precipitate is suspended in water, hydrogen sulfide is introduced in order to precipitate the heavy metal sulfides and after the filtration the component increasing the blood pressure is obtained in the filtrate. After the hydrogen sulfide has been expelled the solution is liberated from the electrolytes by ultra-filtration.

From the aqueous solution which does not pass the ultra-filter the substance is precipitated for further purification by means of albumen- and alkaloid-precipitants and extracted from the precipitate by aqueous solvents having an alkaline reaction. The electrolytes from this filtrate are again eliminated by ultra-filtration and the residue is concentrated under reduced pressure as above described after it has been frequently washed out. A preparation which is further purified is thus obtained.

We claim:

1. The process of preparing a substance increasing the blood pressure from kidneys or spleens which comprises extracting the organic material with an aqueous solution of an electrolyte removing the substance reducing the blood pressure from the extract by dialysis with distilled water, precipitating the substance increasing the blood pressure by saturating the solution with a salt usual for the precipitation of albumen at a pH of 3-5, extracting the substance increasing the blood pressure from the precipitate with water, precipitating the pigments contained in the solution by acidifying the solution, treating the solution with an adsorbing agent and extracting the substance increasing the blood pressure from the adsorbing agent by means of an aqueous solution of an alkaline substance.

2. The process of preparing a substance increasing the blood pressure from kidneys which comprises expressing the kidneys, extracting the pressed cake with a solution of sodium chloride of about 5 per cent strength, removing the substance reducing the blood pressure from the pressed juice and the extract by dialysis, precipitating the substance increasing the blood pressure by saturating the combined solutions with sodium chloride at a pH of 4.4-4.6, extracting the substance increasing the blood pressure from the precipitate with water, precipitating the pigments contained in the solution by acidifying the solution, treating the solution with an adsorbing agent and extracting the substance increasing the blood pressure from the adsorbing agent by means of an aqueous solution of an alkaline substance.

3. The process of preparing a substance increasing the blood pressure from kidneys which comprises expressing the kidneys, extracting the pressed cake with a solution of sodium chloride of about 5 per cent strength, removing the substance reducing the blood pressure from the pressed juice and the extract by dialysis, precipitating the substance increasing the blood pressure by saturating the combined solutions with sodium chloride at a pH of 4.4-4.6 at a temperature of 37° C., extracting the substance increasing the blood pressure from the precipitate with water, precipitating the pigments contained in the solution by acidifying the solution, treating the solution with an adsorbing agent and extracting the substance increasing the blood pressure from the adsorbing agent by means of an aqueous solution of an alkaline substance.

4. The process of preparing a substance increasing the blood pressure from kidneys which comprises expressing the kidneys, extracting the pressed cake with a solution of sodium chloride of about 5 per cent strength, removing the substance reducing the blood pressure from the pressed juice and the extract by dialysis with distilled water, precipitating the substance increasing the blood pressure by saturating the combined solutions with sodium chloride at a pH of 4.4-4.6, extracting the substance increasing the blood pressure from the moist precipitate by dialysis with distilled water, precipitating the pigments contained in the solution by acidifying the solution to a pH value of 3-4 while maintaining a sodium chloride concentration of 2-5 per cent, treating the solution with an adsorbing agent and extracting the substance increasing the blood pressure from the adsorbing agent by means of an aqueous solution of an alkaline substance.

5. The process of preparing a substance increasing the blood pressure from kidneys which comprises expressing the kidneys, extracting the pressed cake with a solution of sodium chloride of about 5 per cent strength, removing the substance reducing the blood pressure from the pressed juice and the extract by dialysis with distilled water, precipitating the substance increasing the blood pressure by saturating the combined solutions with sodium chloride at a pH of 4.4-4.6, extracting the substance increasing the blood pressure from the moist precipitate by dialysis with distilled water, precipitating the pigments contained in the solution by acidifying the solution to a pH value of 3–4 while maintaining a sodium chloride concentration of 2–5 per cent, treating the solution with kaolin and extracting the substance increasing the blood pressure from the adsorbing agent by means of an aqueous solution of secondary sodium phosphate.

6. The process of preparing a substance increasing the blood pressure from kidneys which comprises expressing the kidneys, extracting the pressed cake with a solution of sodium chloride of about 5 per cent strength, removing the substance reducing the blood pressure from the pressed juice and the extract by dialysis with distilled water, precipitating the substance increasing the blood pressure by saturating the combined solutions with sodium chloride at a pH of 4.4–4.6, extracting the substance increasing the blood pressure from the moist precipitate by dialysis with distilled water, precipitating the pigments contained in the solution by acidifying the solution to a pH value of 3–4 while maintaining a sodium chloride concentration of 2–5 per cent, treating the solution with kaolin, extracting the substance increasing the blood pressure from the adsorbing agent by means of an aqueous solution of secondary sodium phosphate and subjecting the solution to ultra-filtration.

GEORG HESSEL.
HANS MAIER.